No. 845,406. PATENTED FEB. 26, 1907.
A. H. GIBSON.
ELECTRICALLY DRIVEN FLUID PRESSOR.
APPLICATION FILED APR. 27, 1905.
2 SHEETS—SHEET 1.
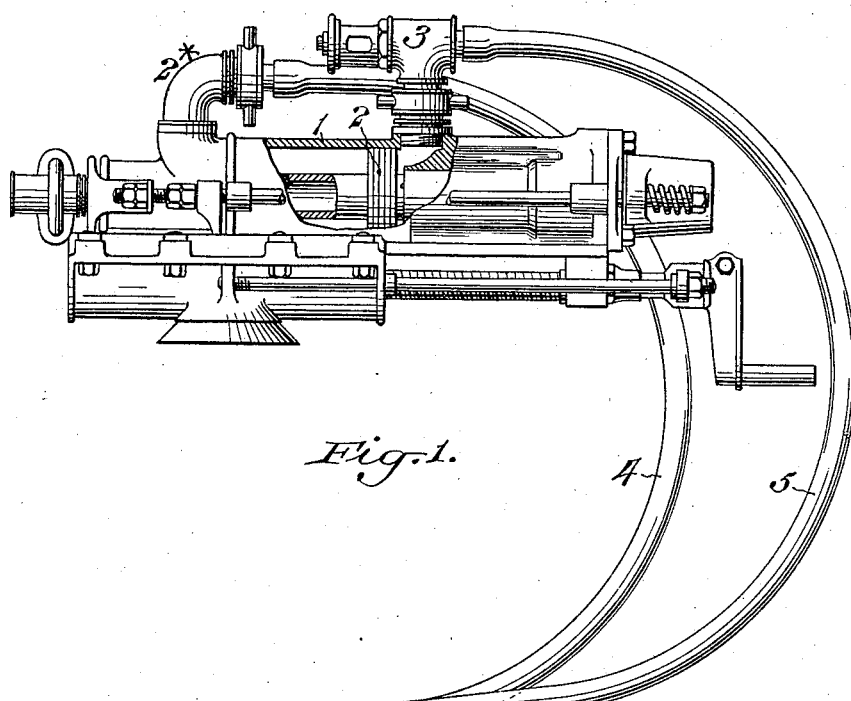
Fig. 1.
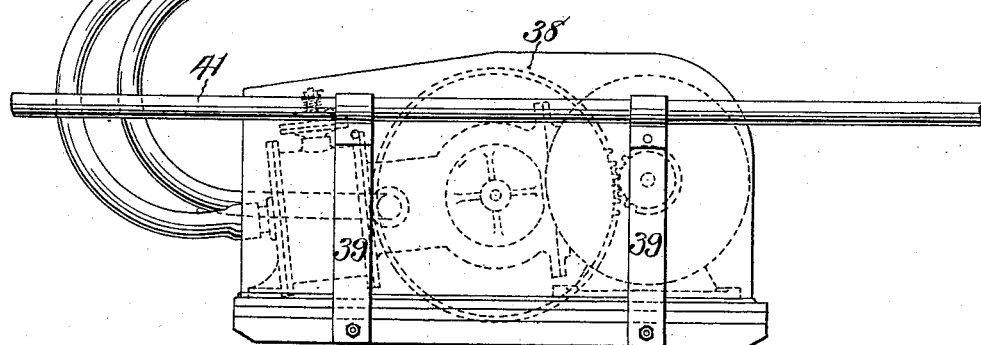
Witnesses:—
F. George Barry.
Henry Thieme.
Inventor:
Arthur H. Gibson
by attorneys No. 845,406. PATENTED FEB. 26, 1907.
A. H. GIBSON.
ELECTRICALLY DRIVEN FLUID PRESSOR.
APPLICATION FILED APR. 27, 1905.

2 SHEETS—SHEET 2.

Witnesses:
F. George Barry,
Henry Thieme

Inventor:
Arthur H. Gibson
by attorneys

THE NORRIS PETERS CO., WASHINGTON, D. C.

UNITED STATES PATENT OFFICE.

ARTHUR HENRY GIBSON, OF EASTON, PENNSYLVANIA, ASSIGNOR TO THE INGERSOLL-SERGEANT DRILL COMPANY, OF NEW YORK, N. Y., A CORPORATION OF WEST VIRGINIA.

ELECTRICALLY-DRIVEN FLUID-PRESSOR.

No. 845,406.　　　　Specification of Letters Patent.　　　　Patented Feb. 26, 1907.

Application filed April 27, 1905. Serial No. 257,736.

*To all whom it may concern:*

Be it known that I, ARTHUR HENRY GIBSON, a subject of the King of Great Britain, and a resident of Easton, in the county of Northampton and State of Pennsylvania, have invented a new and useful Improvement in Electrically-Driven Fluid-Pressors, of which the following is a specification.

The object of my present invention is to provide an electrically-driven fluid-pressor for use in connection with rock-drills and the like, which pressor will be much stronger, lighter, and more compact than has heretofore been possible, so that the pressor will run very steadily and may be readily moved from place to place.

A further object is to provide a pressor of the above character in which a port having a single induction-valve for the pressor-cylinder is used, which port is arranged about midway between the ends of the cylinder, so that all leakage through the valve is prevented by reason of the valve-port being closed by the piston to that end of the cylinder toward which the piston is moving, the valve being so arranged that it will be alternately opened to the one or the other side of the piston, thus obviating the requirement of providing two induction-valves, one at each end of the cylinder.

Figure 2:
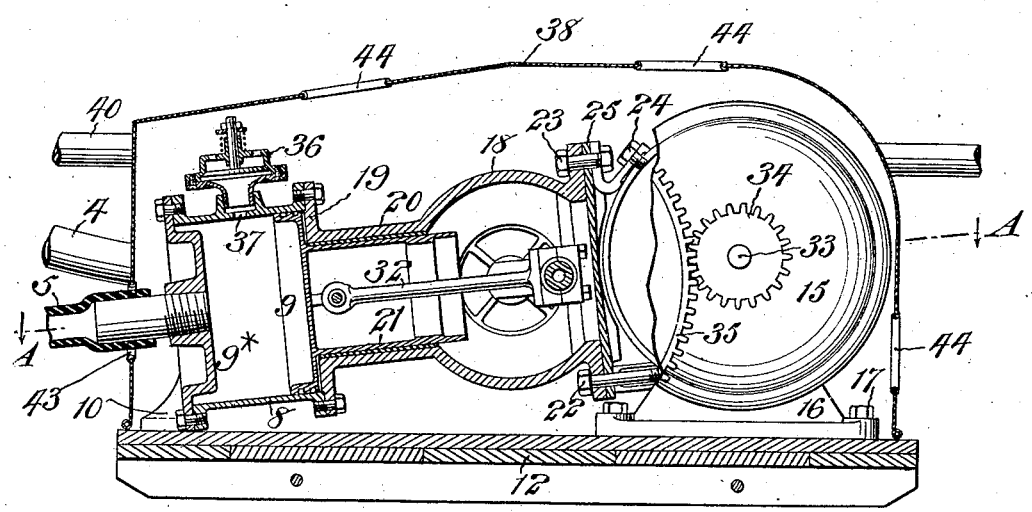
Figure 3:
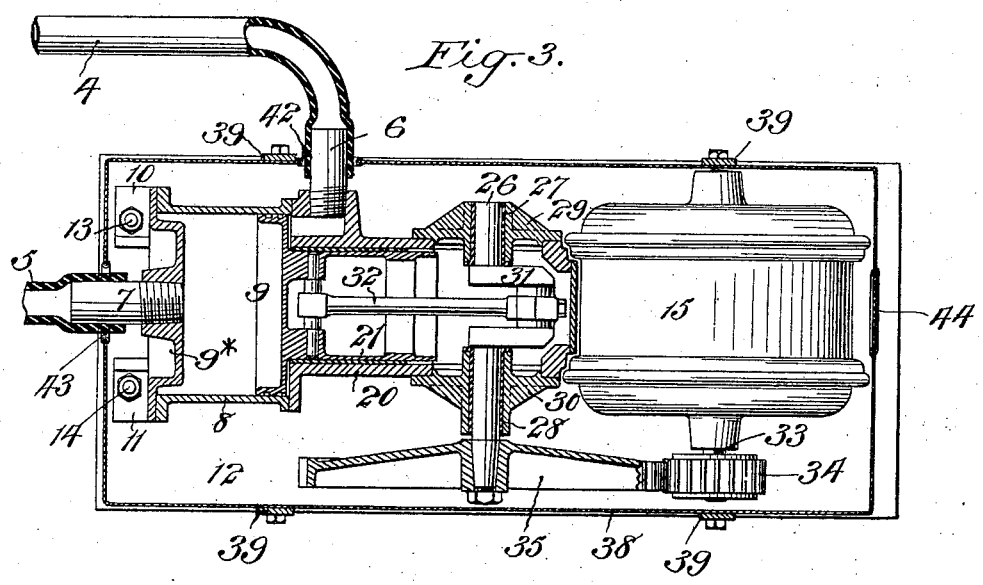

In the accompanying drawings, Figure 1 represents in side elevation my improved electrically-driven fluid-pressor and rock-drill in operative connection through flexible pipes, the rock-drill being shown partially in section. Fig. 2 is a vertical longitudinal section through the pressor, a portion of the electric motor being shown in side elevation; and Fig. 3 is a transverse section taken in the plane of the line A A of Fig. 2 looking in the direction of the arrows, the motor being shown in plan.

A rock-drill of any well-known or approved construction is shown herein, the cylinder of which is denoted by 1. The opposite ends of this cylinder, upon both sides of the piston 2, are provided with suitable couplings 2* and 3, to which the corresponding ends of two flexible pipes 4 and 5 are connected. The other ends of the said flexible pipes are interchangeably connected to couplings 6 and 7 at the ends of the pressor-cylinder 8, upon opposite sides of its piston 9. The outer head 9* of the pressor-cylinder 8 is provided with brackets 10 and 11, which are rigidly secured to a suitable base 12, near one end thereof—as, for instance, by bolts 13 14.

An electric motor of any well-known and approved form is used for driving the pressor, the casing of which motor is denoted by 15. The motor-support 16 is secured on the base 12 at a distance to the rear of the pressor-cylinder—as, for instance, by means of bolts 17. A crank-shaft casing 18 is interposed between the pressor-cylinder 8 and the motor-casing 15, which crank-shaft casing in the present instance is formed integral with the rear head 19 of the pressor-cylinder and the hollow cylindrical body 20, which forms a guide for the hollow trunk 21 of the pressor-piston 9. The rear end of the crank-shaft casing 18 is secured to the motor-casing 15, in the present instance by means of bolts 22 23 24 and an intermediate plate 25. The crank-shaft 26 is mounted in suitable bearings 27 28 in the side heads 29 30 of the crank-shaft casing. The crank 31 of this crank-shaft 26 is connected to the piston 9 by a pitman-rod 32. The shaft 33 of the motor is connected to the crank-shaft 26 for the purpose of driving the same, in the present instance by providing the motor-shaft 33 with a pinion 34, which meshes with a spur-gear 35, fixed to the crank-shaft 26 exterior to the crank-shaft casing. For insuring great rigidity of the parts, and thereby a very steady operation of the same, the crank-shaft and motor-shaft are so located with respect to the pressor-cylinder that a projection of the longitudinal central line of the cylinder intersects the axes of the said shafts. The apparatus may be lightened up and at the same time a steady running of the same be insured by the direct connection between the motor-casing and the crank-shaft casing, the crank-shaft casing and the pressor-cylinder because of this connection being capable of being made of aluminium.

About midway between the ends of the cylinder 8 I provide an induction-valve 36, its port, which opens into the cylinder, being denoted by 37. As the piston 9 is reciprocated to force the columns of air to one side or the other of the rock-drill piston 2 through the flexible pipes 4 and 5 the port 37 of the induction-valve 36 is alternately opened to the one and the other side of the piston 9.

A housing 38, of sheet metal or other suitable material, is provided for inclosing the motor and pressor, which housing is secured to the portable base 12, in the present instance by side straps 39. These side straps are also used for securing side handle-bars 40 41 along the housing in suitable position for permitting the carrying of the parts from place to place as required. These handle-bars 40 41 may project any desired distance to the front and rear of the housing 39. The housing 39 is provided with suitable openings 42 43 therethrough for the pipe-couplings 6 and 7 of the flexible pipes 4 and 5, which lead to the rock-drill. This housing may also be provided with other openings 44 for gaining access to the interior of the housing at different points.

With the flexible pipes 4 and 5 coupled as shown the operation is as follows: As the pressor-piston 9 starts its forward stroke to move a column of air through the pipe 5 for imparting the forward stroke to the drill-piston 2 the piston will close the port 37 after it has completed about half of its forward movement, so that the balance of the forward movement of the piston for completing the movement of the air column may be accomplished without danger of leakage of the air through the induction-valve 36, thus obviating a fault which would occur where induction-valves are used at both ends of the cylinder. Furthermore, as the piston nears the completion of its forward stroke the smaller space back of the piston is brought into open communication through the valve 36 and port 37 with the outside atmosphere. As the pressor-piston 9 returns to the limit of its inward movement it will again first close the port 37 and finally compress the air in the smaller space between the piston and the rear head of the cylinder for forcing the column of air through the flexible pipe 4 to the front of the drill-piston 2 to retract the drill. As the pressor-piston 9 nears the limit of its inward movement it will be seen that the larger space in front of the piston is brought into open communication with the exterior atmosphere through the induction-valve 36 for equalizing the pressure within and without the cylinder.

It is evident that various changes might be resorted to in the construction, form, and arrangement of the several parts without departing from the spirit and scope of my invention. Hence I do not wish to limit myself strictly to the construction herein set forth; but

What I claim as my invention is—

1. The combination with the cylinder of a percussive tool and a piston therefor, of a fluid-pressor cylinder, a piston therefor, pipes connecting the two cylinders, said pipes being permanently open to the interior of the fluid-pressor cylinder upon opposite sides of its piston and an induction-valve open at all times to external atmosphere having its port located intermediate the ends of the pressor-cylinder and arranged to be brought alternately into communication with the interior of the cylinder on opposite sides of the pressor-piston as the piston is reciprocated.

2. An electrically-driven fluid-pressor comprising a portable base, a motor-casing fixedly secured to the base, a pressor-cylinder fixedly secured to the base independently of the motor-casing and a crank-shaft casing interposed between and supported solely by the motor-casing and pressor-cylinder.

3. An electrically-driven fluid-pressor comprising a portable base, a motor-casing fixedly secured to the base, a pressor-cylinder fixedly secured to the base independently of the motor-casing and a crank-shaft casing interposed between and supported solely by the motor-casing and pressor-cylinder, the motor-casing, the crank-shaft casing and the pressor being located in alinement in a substantially horizontal plane.

4. An electrically-driven fluid-pressor comprising a portable base, a motor-casing fixedly secured to the base, a pressor-cylinder having its outer head fixedly secured to the base and an interposed crank-shaft casing secured directly to the motor-casing and extended to form the inner head of the pressor-cylinder whereby the crank-shaft casing is supported solely by the motor-casing and pressor-cylinder.

In testimony that I claim the foregoing as my invention I have signed my name, in presence of two witnesses, this 14th day of April, 1905.

ARTHUR HENRY GIBSON.

Witnesses:
H. D. MAXWELL,
CLARA D. PATTERSON.